United States Patent [19]
Audi et al.

[11] Patent Number: 5,438,552
[45] Date of Patent: * Aug. 1, 1995

[54] SONAR SYSTEM FOR IDENTIFYING FOREIGN OBJECTS

[75] Inventors: Paul P. Audi, Newport; Michael A. Deaett, North Kingston; Stephen G. Johnson, Little Compton, all of R.I.

[73] Assignee: Raytheon Company, Lexington, Mass.

[*] Notice: The portion of the term of this patent subsequent to Jun. 14, 2011 has been disclaimed.

[21] Appl. No.: 220,893

[22] Filed: Mar. 31, 1994

Related U.S. Application Data

[62] Division of Ser. No. 54,771, Apr. 27, 1993, Pat. No. 5,321,667.

[51] Int. Cl.$^6$ ............................................. G01S 15/00
[52] U.S. Cl. ........................................ 367/88; 382/195
[58] Field of Search ............................ 367/88, 87, 131; 382/48, 10

[56] References Cited

U.S. PATENT DOCUMENTS 5,018,214  5/1991  Pasch .................................... 382/9
5,321,667  6/1994  Audi et al. ........................... 367/88

Primary Examiner—Ian J. Lobo
Attorney, Agent, or Firm—Donald F. Mofford

[57] ABSTRACT

A sonar system is provided for identifying a foreign object includes a technique for providing a two dimensional array of pixels, each one of the pixels representing the intensity of a signal at a predetermined range position and a predetermined cross-range position from a reference position and quantizing the intensity of each one of the pixels into one of a plurality of levels. The technique further includes comparing a distribution of the levels of pixels over a range scan at a cross-range position with the distribution of levels of pixels over a range scan at a different cross-range position to identify the existence of a foreign object. With such an arrangement a sonar system is provided that can automatically detect the existence of a foreign object such as a mine.

19 Claims, 11 Drawing Sheets

|  |  | REGION 3 |  |  | REGION 4 |  |  |
|---|---|---|---|---|---|---|---|
| P(8,1) 0 | P(8,2) 0 | P(8,3) 0 | P(8,4) 0 | P(8,5) 0 | P(8,6) 0 | P(8,7) 0 | P(8,8) 0 |
| P(7,1) 0 | P(7,2) 1 | P(7,3) 1 | P(7,4) 0 | P(7,5) 2 | P(7,6) 2 | P(7,7) 0 | P(7,8) 0 |
| P(6,1) 0 | P(6,2) 0 | P(6,3) 1 | P(6,4) 0 | P(6,5) 0 | P(6,6) 0 | P(6,7) 0 | P(6,8) 0 |
| P(5,1) 0 | P(5,2) 0 | P(5,3) 0 | P(5,4) 0 | P(5,5) 0 | P(5,6) 1 | P(5,7) 0 | P(5,8) 0 |
| P(4,1) 0 | P(4,2) 2 | P(4,3) 0 | P(4,5) 0 | P(5,5) 1 | P(5,6) 1 | P(5,7) 1 | P(5,8) 0 |
| P(3,1) 0 | P(3,2) 2 | P(3,3) 0 | P(3,4) 1 | P(3,5) 1 | P(3,6) 0 | P(3,7) 1 | P(3,8) 1 |
| P(2,1) 0 | P(2,2) 0 | P(2,3) 0 | P(2,4) 1 | P(2,5) 0 | P(2,6) 0 | P(2,7) 0 | P(2,8) 1 |
| P(1,1) 0 | P(1,2) 0 | P(1,3) 0 | P(1,4) 0 | P(1,5) 0 | P(1,6) 0 | P(1,7) 0 | P(1,8) 0 |

REGION 2 → P(3,2); REGION 1 → P(2,8)

*FIG. 9A*

| a | $P_n(i,j)$ |
|---|---|
| b | c |

| 0 | 0 | 0 | 0 | 0 | 0 | 0 | 0 |
|---|---|---|---|---|---|---|---|
| P(7,1) 0 | P(7,2) 6 | P(7,3) 6 | P(7,4) 0 | P(7,5) 7 | P(7,6) 7 | P(7,7) 0 | P(7,8) 0 |
| P(6,1) 0 | P(6,2) 0 | P(6,3) 5 | P(6,4) 0 | P(6,5) 0 | P(6,6) 0 | P(6,7) 0 | P(6,8) 0 |
| P(5,1) 0 | P(5,2) 0 | P(5,3) 0 | P(5,4) 0 | P(5,5) 1 | P(5,6) 0 | P(5,7) 0 | P(5,8) 0 |
| P(4,1) 0 | P(4,2) 3 | P(4,3) 0 | P(4,4) 0 | P(4,5) 1 | P(4,6) 1 | P(4,7) 1 | P(4,8) 0 |
| P(3,1) 0 | P(3,2) 3 | P(3,3) 0 | P(3,4) 1 | P(3,5) 1 | P(3,6) 0 | P(3,7) 4 | P(3,8) 4 |
| P(2,1) 0 | P(2,2) 0 | P(2,3) 0 | P(2,4) 1 | P(2,5) 0 | P(2,6) 0 | P(2,7) 0 | P(2,8) 2 |
| P(1,1) 0 | P(1,2) 0 | P(1,3) 0 | P(1,4) 0 | P(1,5) 0 | P(1,6) 0 | P(1,7) 0 | P(1,8) 0 |

*FIG. 9K*

| "INTEGER INDEX" (n) | "VALUE" | | |
|---|---|---|---|
| 0 | 0 | | |
| 1 | 1 | | |
| 2 | 2 | 4 | 1 |
| 3 | 3 | | |
| 4 | 4 | 1 | |
| 5 | 5 | 6 | |
| 6 | 6 | | |
| 7 | 7 | | |

*FIG. 9J*

SONAR SYSTEM FOR IDENTIFYING FOREIGN OBJECTS

This application is a divisional of application Ser. No. 08/054,771 filed Apr. 27, 1993, now U.S. Pat. No. 5,321,667.

BACKGROUND OF THE INVENTION

This invention relates generally sonar systems and more particularly to sonar systems adapted to map the bottom of a body of water and to identify submerged foreign objects.

As is known in the art, it is sometimes desirable to identify submerged foreign objects such as mines, cables or oil pipe lines using sonar. A common sonar type used for examining the sea bottom is a Side Looking Sonar (SLS). A SLS is either towed or mounted on an underwater vehicle and is moved through the water in a forward direction at an approximately constant speed and depth. The sonar transmits a short (typically 0.10 to 0.20 ms), high frequency (typically 500 kHz) pulse into the water and has a very narrow horizontal beam-width (typically 1 degree or less) in a direction perpendicular to the forward direction. The pulse propagates through the water, reflects off of the sea bottom and the echo returns to the sonar. After transmission, the sonar begins receiving the echoes. Echoes that arrive later in time come from further away on the sea bottom. The received signal maps to a long, thin strip of the sea bottom and is called a range scan. After a fixed elapsed time, and after the vehicle has moved a short distance in the forward (or cross-range) direction, the sonar stops receiving and begins a new transmission. The length of the fixed elapsed receive time determines the maximum range of the sonar along the sea bottom. The range may be also limited by the sonar power. Because of spreading and absorption loss, the received intensity decreases with range (time elapsed from transmission). This is compensated for in the sonar by a Time Varying range-variable Gain (TVG). The beamwidth and pulse length determine the sonar's azimuth and range resolutions, respectively. As the sonar moves in the forward (i.e. cross-range) direction, the range scans correspond to subsequent parallel strips along the sea bottom thereby producing a two dimensional "map" of the sea bottom: sonar received intensity (i.e. the z axis) vs. range (i.e. the x-axis) and cross-range (i.e. the y-axis). A SLS sometimes transmits and receives on both the port and starboard sides and produces two images.

Because the sonar travels at a certain altitude above the sea bottom, the first echoes are very faint and are a product of volume scattering in the water between the sonar and the sea bottom. This is called the water column and its length (in time) depends on the sonar's altitude. These faint echoes give no information about the sea bottom and are therefore removed from the scan data. What remains is the two-dimensional "map" of the sea bottom: sonar received intensity vs. range and cross-range; this is called the raw image data. Because the grazing angle decreases with range and a shallow grazing angle produces less backscatter, the image intensity decreases with range. This is apparent in the raw image data: the near range data is much more intense than the far range data. The raw image data is normalized to eliminate the effect of grazing angle to form the normalized image data.

The normalized image data can be thought of as a map of the sea bottom but this can be misleading. Although elevations will often produce stronger echoes (and therefore higher image intensity) and depressions will often produce weaker echoes (lower image intensity), echo intensity is also affected by the reflectivity of the sea bottom, the texture of the sea bottom and the local grazing angle at the sea bottom.

A mine on the sea bottom may produce a region of high intensity in the image (highlight) by reflecting directly back to the sonar. It may also produce a region of low intensity in the image (shadow) by blocking the sea bottom beyond itself from ensonification; these shadows are sometimes very long. If a mine is partially buried, it may not reflect any energy back to the sonar but instead reflect it away, this produces a shadow without a highlight. A method is required to analyze these patterns of shadow, background and highlight regions of SLS imagery to recognize the existence of candidate mine objects. Subsequent use of a neutralization system to remove candidate objects which pose obstructions to safe navigation follows the mine recognition processing effort.

Today, mine recognition in sonar imagery is generally performed manually. Human operators are trained to evaluate the high-resolution imagery and look for clues to a mine, which has a set of typical characteristics. Human interpretation is the current state of the art for SLS imaging sonars. The operator must spend considerable time analyzing the data to determine which returns are from mines.

SUMMARY OF THE INVENTION

In accordance with the present invention a sonar system is provided for mapping the bottom of a body of water to identify a submerged foreign object. A sequence of the sonar pulses is transmitted and directed toward the bottom. The mapping is formed from a sequence of echo returns. Each one of the echo returns is produced as a range scan in a range direction in response to a corresponding one of the transmitted sonar pulses. The sonar system stores signals representative of the intensity of the echo returns in a two dimensional array of pixels. Each one of the pixels represents the intensity of the echo return at a predetermined range position from the system in the range direction and a predetermined cross-range position from a reference position of the system in the cross-range direction. The system quantizes the intensity of each one of the pixels into one of a plurality of levels, and compares the distribution of the levels of pixels over a range scan at a cross-range position with the distribution of levels of pixels over a range scan having a different cross-range position to identify the existence of an underwater object.

More particularly, the sonar system provides an automated mine recognition system using computer evaluation of imagery to make a mine/non-mine classification decision. The automated system may run unattended or serve as a decision aid to an operator, prioritizing mine-like objects. This relieves the operator from tiresome evaluation of areas which contain no candidate mines. The operator can thus spend more quality time with the mine-like objects. The automatic system provides important backup for inexperienced or distracted operators.

The sonar system produces an intensity range data image derived from backscatter of acoustic energy.

Generally, in an area where there are no mines, the locally imaged sea bottom produces a characteristic background in the sonar imagery made up of highlights and shadows. A mine object in typical backgrounds ranging from smooth sand and mud to rocky areas with dense vegetation disturbs the statistical stationarity of the background resulting in a statistical anomaly. The area of the anomaly is defined by the mine size, imaging resolution and geometry, beampattern and other sonar characteristics. The sonar system exploits the statistical anomaly produced by the mine in the sonar imagery. The side looking sonar utilizes non-linear combinations of statistically advanced "goodness-of-fit" tests and distributional analysis calculations to identify the mines.

To obtain these and other objects of this invention, an SLS system produces an intensity range scan data derived from backscatter of transmitted pulse acoustic energy. These sequential intensity range scans are then organized in memory as sequential rasters of a two dimensional (range and track) image which is then normalized according to common practice by use of a moving window normalizer to produce a normalized SLS image which is processed by the mine recognizer.

The mine recognizer first divides the image into contiguous frames of 512 sequential rasters each. Each of these frames is then separately processed.

In a first step, the image is amplitude segmented by multipass median filtering of the data, then by amplitude segmenting the pixels into highlight, shadow and background categories according to data dependent thresholds. A subsequent median filter is employed on the three part data to eliminate spurious collections of gathered noise pixels. The segmented pixel data then contains regions of contiguous highlight, or shadow pixels which are associated and ascribed a symbolic label (numerical index). The labeled regions are then sorted by area and regions falling below an area threshold or above a second area threshold are eliminated from the region list. The labeled regions are then made available to the split window processor.

According to the double split window aspect of this invention, a window or data mask of fixed dimension in range and track is formed and is sequentially displaced at various regularly spaced locations across the image. At each placement, the pixel intensities in each of the three parallel and associated subwindows are analyzed according to several statistical features to determine if the statistics of the pixel intensity distributions in the associated subwindows reliably correspond to differing underlying statistical distributions. In addition, the placement of the established highlight and shadow regions across the subwindows at each location as well as the regions/sizes are used to qualify the statistically based decisions for each window placement. The qualified decisions are produced according to a set of threshold manipulated rules for operating on the output of the windowed statistics generator. Each window location which generates qualified statistics exceeding threshold limits is identified as a likely location for a bottomed marine mine. Generated marking boxes enclosing the imagery of such identified locations are then passed on to an operator for subsequent evaluation.

Accordingly to another aspect of this invention, the marked regions may be passed on to the mission controller/navigator of an autonomous marine vehicle for proper evasive action.

BRIEF DESCRIPTION OF THE DRAWINGS

For a more complete understanding of the concepts of the invention, reference is now made to the following drawings, in which:

FIGS. 9A–9K are diagrams useful in understanding the region labelling process used in the processing described in connection with the flow diagram of FIGS. 5A, 5B and 5C;

DESCRIPTION OF THE PREFERRED EMBODIMENTS

Figure 1:
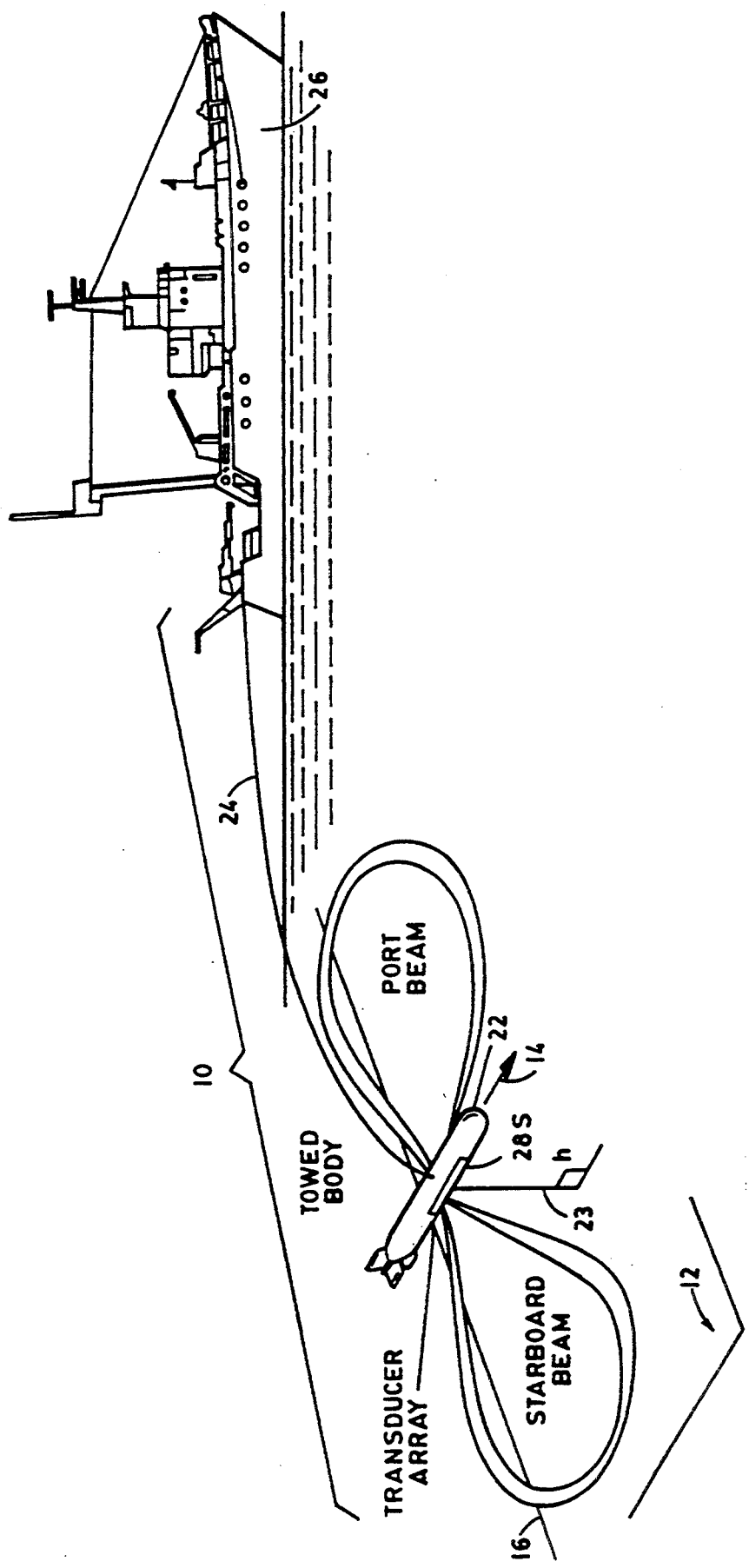
FIG. 1 is a diagram of a side looking sonar system adapted to map the bottom of a body of water and to identify submerged foreign objects according to the invention.
Figure 2:
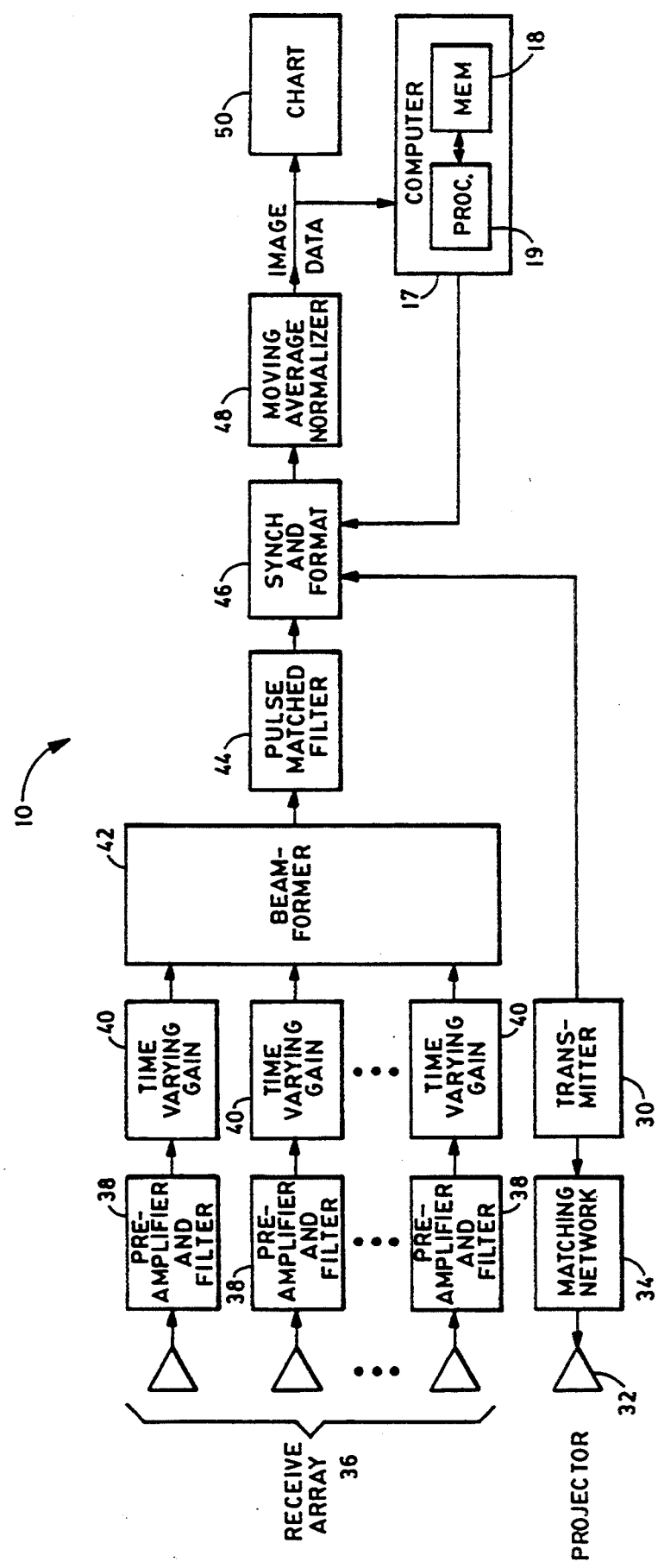
FIG. 2 is a block diagram of the sonar system of FIG. 1.
Figure 3:
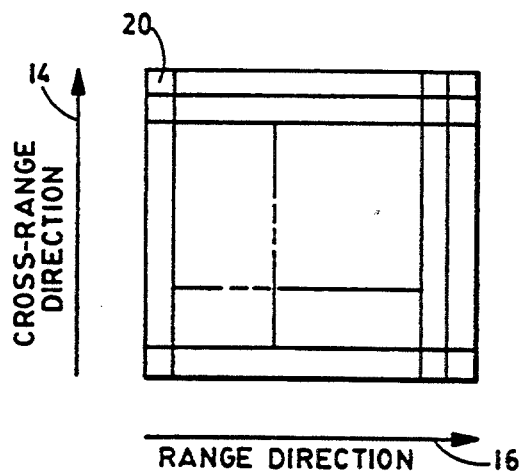
FIG. 3 is a diagram used to describe the range direction and cross range direction used by the sonar system of FIG. 1.

Referring now to FIGS. 1 and 2, a side looking sonar system 10 is shown. The side looking sonar system 10 maps the bottom 12 to identify a submerged foreign object. As the sonar system 10 moves in a forward, or cross-range direction 14, a sequence of the sonar pulses is transmitted and directed toward the bottom in a range direction 16 perpendicular to the cross-range direction 14. The mapping is formed from a sequence of echo returns. Each one of the echo returns is produced as a range scan in the range direction 16 in response to a corresponding one of the transmitted sonar pulses. The sonar system 10 includes a digital computer 17 and stores in a memory 18 thereof signals representative of the intensity of the echo returns in a two dimensional array (FIG. 3) of cells or pixels 20. Each one of the pixels 20 represents the intensity I of the echo return at a predetermined range position from the system in the range direction 16 and a predetermined cross-range position from a reference position of the system in the range direction 14. The system quantizes the intensity of each one of the pixels into one of a plurality of levels, and compares the distribution of the levels of pixels over a range scan at a cross-range position with the distribution of levels of pixels over a range scan at a different cross-range position to identify the existence of an underwater object.

More particularly, a submerged, towed body 22 (FIG. 1) is tethered at the end of a cable 24, here a 25 to 150 meter tow cable. The tow cable 24 supplies power, control signals, and returns detected sonar signals to a surveillance vehicle, here a ship 26. (Alternatively, the surveillance vehicle may be a helicopter or a remotely controlled underwater vessel). Port and starboard transmit/receive transducer arrays (only starboard array 28s being shown) are mounted on the sides of the towed body 22 to provide, here, approximately 50 degrees of vertical directivity and 1.5 degrees of horizontal beamwidth at 100 kHz and 0.5 degrees at 400 kHz. The towed body 22 normally operates at a height (h) 23 above the sea bottom 12 which, here is 10 percent of the maximum range. The high resolution 400 kHz selection produces a resolution of 15 centimeters in both range and azimuth with the range resolution being provided by a 0.2 msec CW sonar pulse. The high resolution mode typically yields minimum and maximum ranges of 5 meters and 50 meters, respectfully. The speed of the towed body is here typically 2 to 5 knots.

The sonar system 10 includes a conventional sonar transmitter 30. A sequence of pulses produced by the transmitter 30 is fed to a projector 32 through a matching network 34 in a conventional manner to produce transmitted sonar pulses, or pings. The pings are transmitted periodically at a rate which covers the selected range without ambiguity. Thus, for a 50 meter selection, a repetition rate of about 15 transmissions per second suffices. The echo return produced in response to each transmitted sonar pulse is received by an array of sonar transducers 36 and passes through a transmit/receive switch (not shown) to preamplifiers 38, in a conventional manner, as shown. A subsequent amplifier 40 applies a time varying gain (TVG) selected in a conventional manner to match the expected decay curve of the return energy. The resulting signals are combined in a conventional beamforming network 42. The output of the beamforming network 42 is passed through a filter 44 which is matched to the waveform of the transmitted sonar pulse and the filter 44 output represents the energy detected. The detected energy signal is synchronized with the waveform of the transmitted pulse via synchronizer and format network 46 to produce raster-formatted floor-backscatter raw image. Since this image still contains wide area fluctuations due to bottom type and bottom slope variations, a conventional moving average normalizer 48 is passed over the data. The resulting image is then displayed by chart 50 in conventional waterfall, strip chart format, as shown in FIG. 4.

Figure 4:
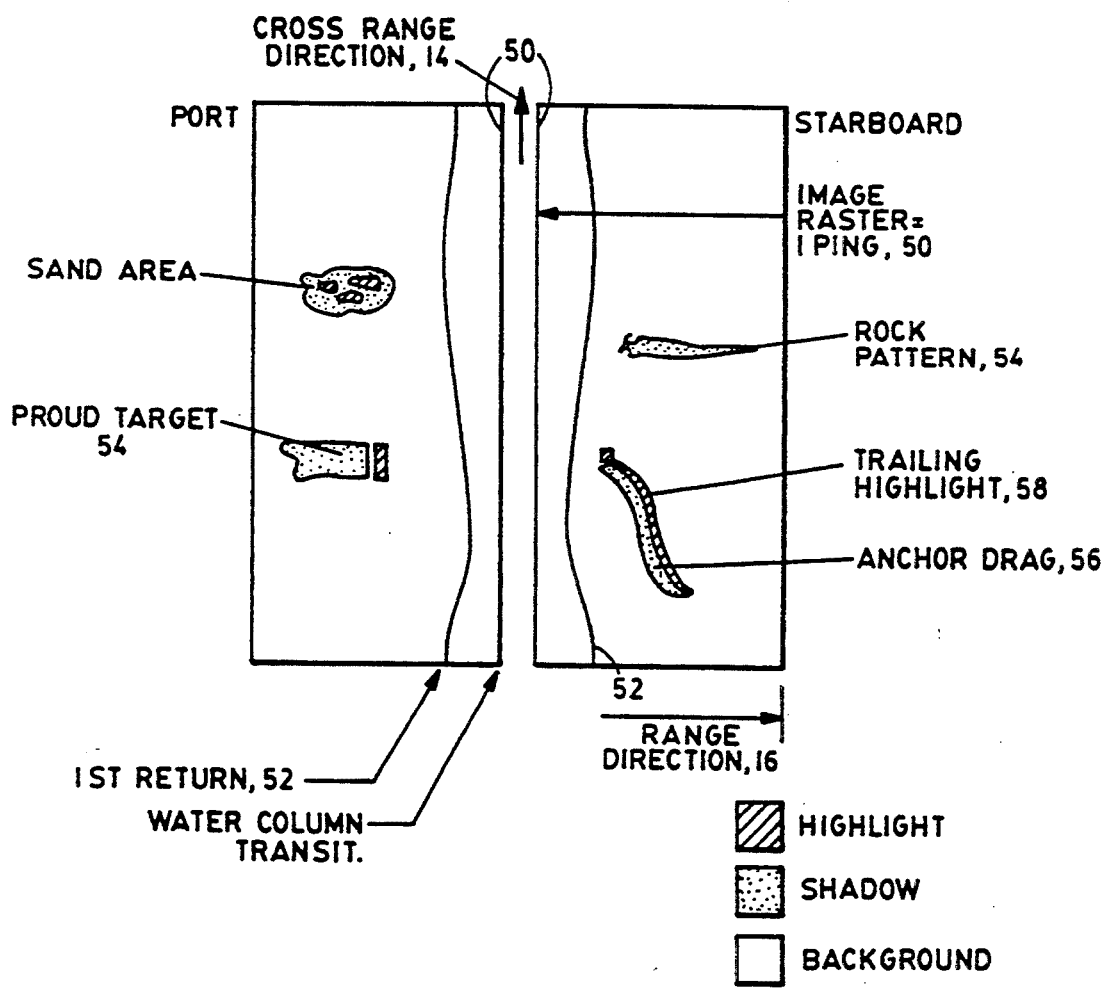
FIG. 4 is a sketch illustrating submerged foreign objects typically found on the bottom of water being mapped by the sonar system of FIG. 1.

The image content, shown in FIG. 4, includes a first area of minimal volume reverberation 50 is followed by a strong bottom return 52. The mid range typically displays a high contrast producing strong backscatter or highlights from proud targets 54 (i.e. mines) and associated shadows due to the absence of downrange reflected energy. An idea of the height and shape of the bottom object can sometimes be obtained from the shape of the shadow although floor texture variations and local undulations cause many distortions. Another common feature is the anchor drag 56 shown by a line-like shadow which is here shown oriented in a downrange direction 16. This extended shadow has a downrange highlight, 58 due to the depression of the anchor drag 56. In addition, there are many other side-scan image characteristics too numerous to discuss here. It is noted, however, that the side looking sonar system 10 may run unattended or serve as a decision aid to an operator, prioritizing mine-like objects. This relieves the operator from tiresome evaluation of areas which contain no candidate mines. The operator can thus spend more quality time with the mine-like objects. The automatic system provides important backup for inexperienced or distracted operators.

Figure 5A:
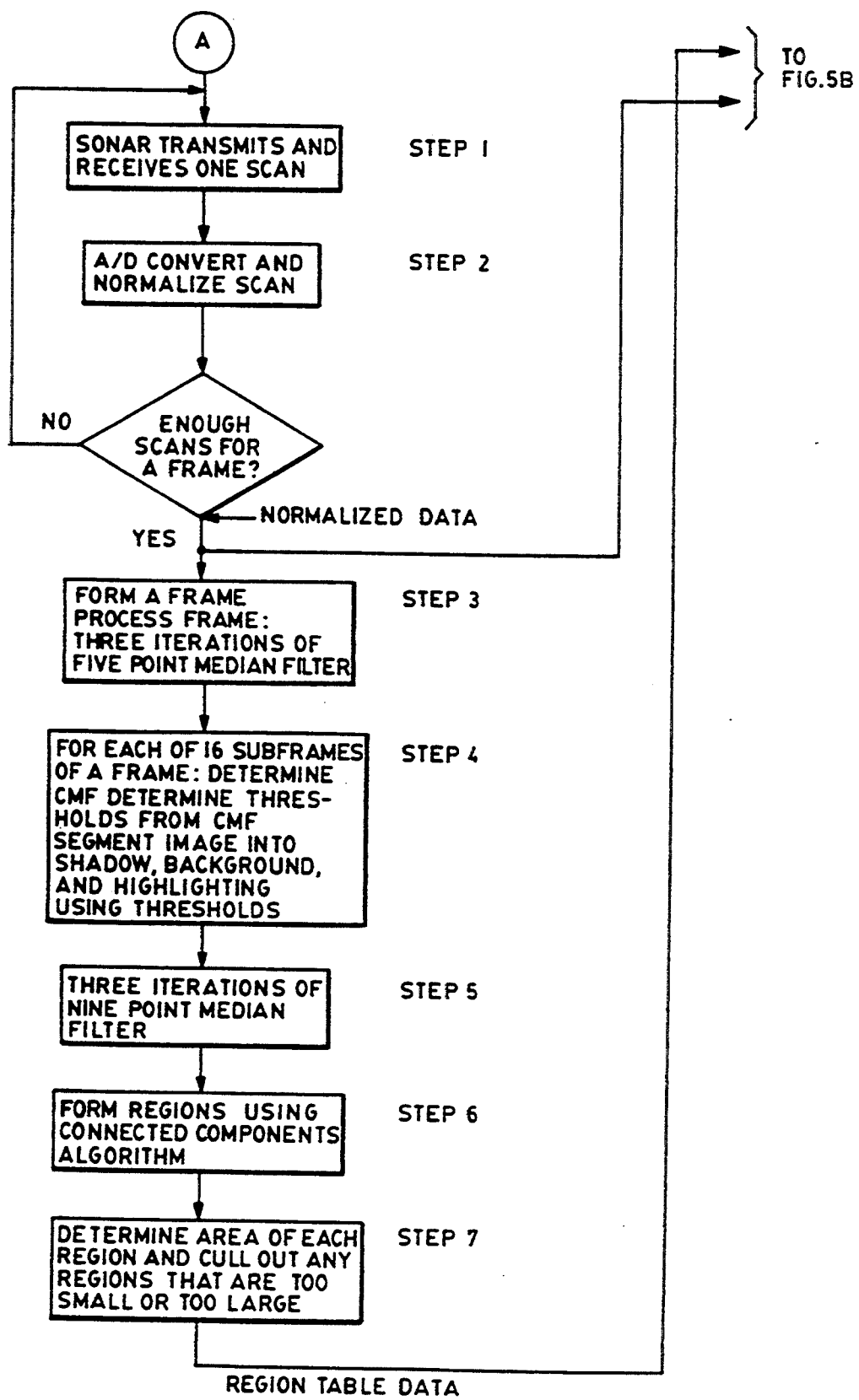
FIGS. 5A, 5B and 5C are a flow diagram of the processing used by the sonar system of FIG. 1.
Figure 5B:
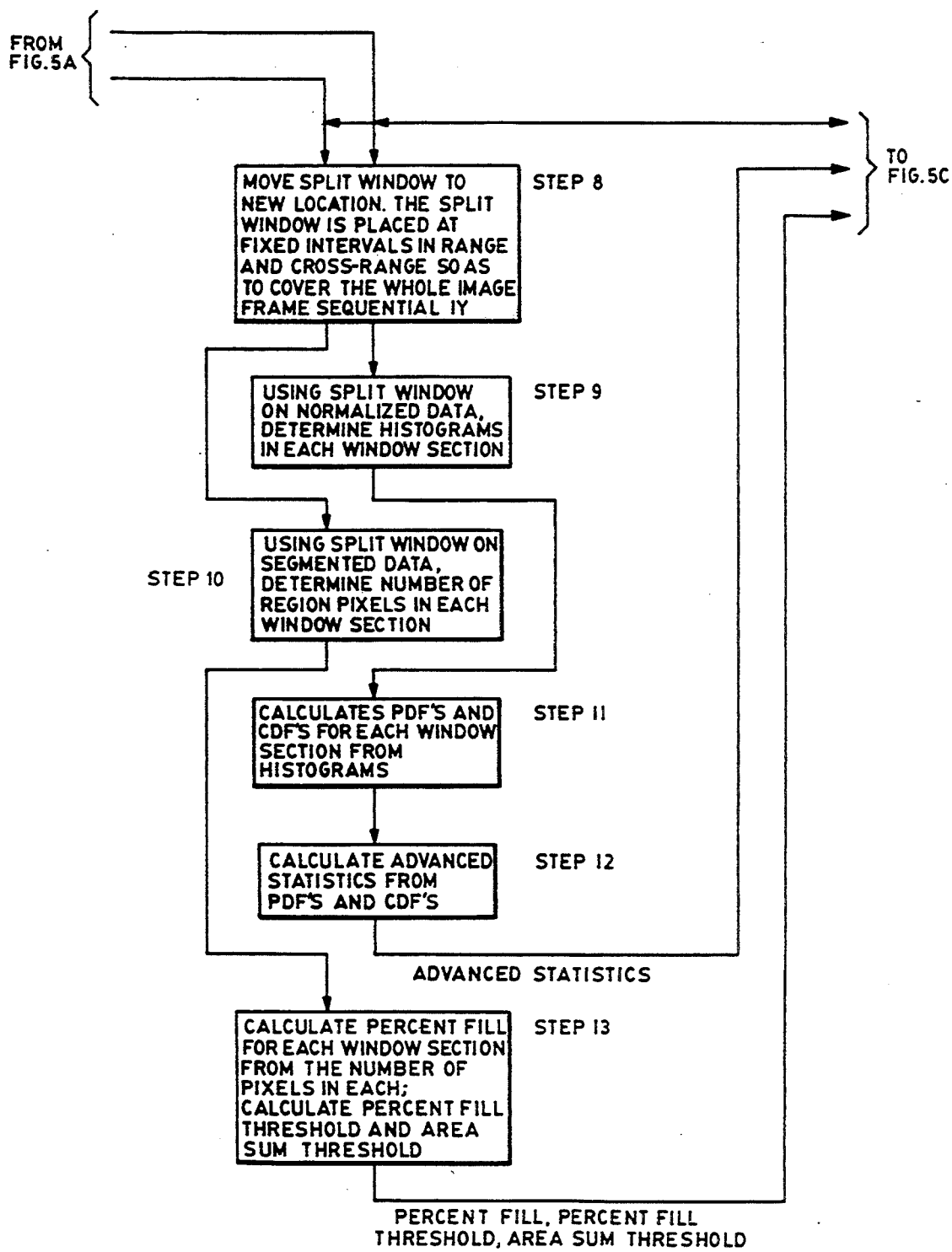
Figure 5C:
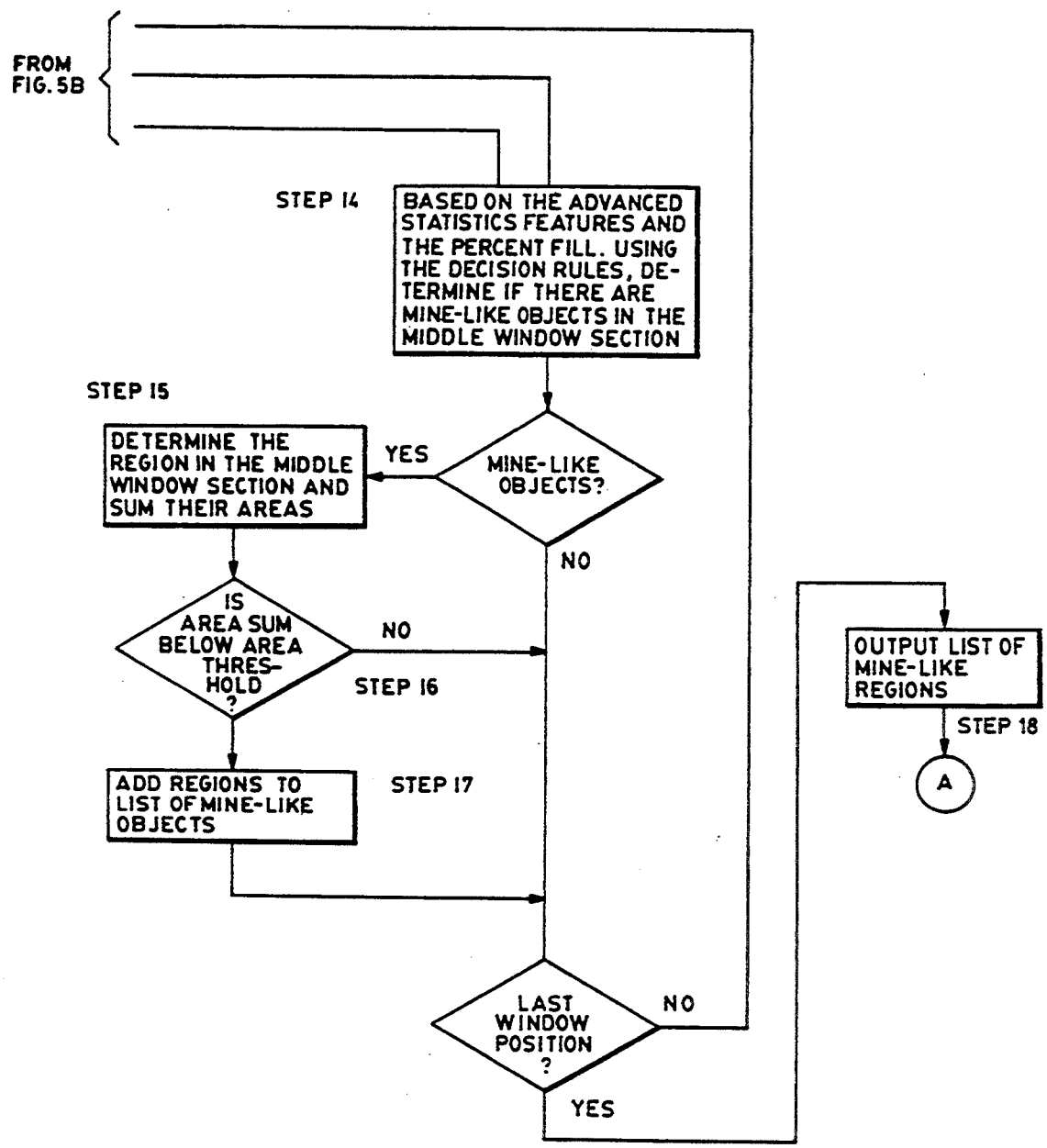

Referring again to FIG. 2, the side looking sonar system (SLS) 10 is shown to include a digital computer 17, here a conventional workstation type computer having the memory 18 and processor 19. The memory 18 is used to store data and a program. The program includes a set of instructions to enable the processor 19 to process data stored in the memory 18 in accordance with the program. FIGS. 5A, 5B and 5C are a flow diagram of the stored program. Steps 1 and 2 correspond to the sonar ranging and normalization which produce frames of raw image data. Each frame is a two dimensional map formed from a sequence of echo returns (here a frame is 512 range scans each of which consists of 1024 positions (or pixels), for example). Each one of the echo returns is produced as a range scan in the range direction 16 in response to a corresponding one of the transmitted sonar pulses. The sonar system 10 stores in memory 18 thereof signals representative of the intensity of the echo returns in a two dimensional array (FIG. 3) of pixels 20. Each one of the pixels 20 represents the intensity I of the echo return at a predetermined range position from the system in the range direction 16 and a predetermined cross-range position in the cross-range direction 14 from a reference position of the system 10. The processor 19 normalizes the data. In Steps 3 through 7 the processor 19 processes the raw image data to quantize the intensity of each one of the pixels into one of three levels (i.e. background, highlight, and shadow) and implement the region formation and selection (i.e., culling) process based on the three level quantization amplitude segmentation. Steps 8 through 13 comprise the window-based statistical feature extraction steps which are based on probability distributions and on segmentation-derived region window coverage percentages. Steps 14 through 17 are the decision calculations which evaluate the statistical features and window coverage percentages to determine if a mine-like object is present in the imagery. The locations of such objects are then fed out to memory 18 along with sections of imagery data as is indicated in step 18. Each of these steps is discussed in more detail below.

Image Quantization and Region Extraction (Steps $3 \propto 7$)

Image quantization (or segmentation) is used to determine region features. The original byte-per-pixel intensity data image in memory 18 is partitioned (i.e. quantized) spatially (i.e. segmented) into areas whose overall intensity is high (highlights), areas whose overall intensity is low (shadows) and areas whose overall intensity is average (background). Quantizing the image to the three levels (high, low, average) in this way produces contiguous image areas called regions whenever pixels in an area have similar low or high values. Such regions may be due to an image highlight or to a shadow resulting from a mine.

More particularly, after normalization, the normalized image data in memory 18 is examined by the processor 19 on a frame basis; each frame has the same range dimension as the normalized data and contains a fixed number of scans. The rest of the processing is done on the image frame, which is typically 1024 pixels in range by 512 pixels in cross-range (scans). The normalized pixel or position data are typically one byte integers with minimum intensity at 0 and maximum intensity at 255. The steps subsequent to normalization are:

1. Three five-point median filters (Step 3)
2. Quantization (Step 4)
3. Three nine-point median filters (Step 5)
4. Connected-components (Step 6 )
5. Region formation (Step 7).

Three five-point median filters (Step 3)

Figure 6:
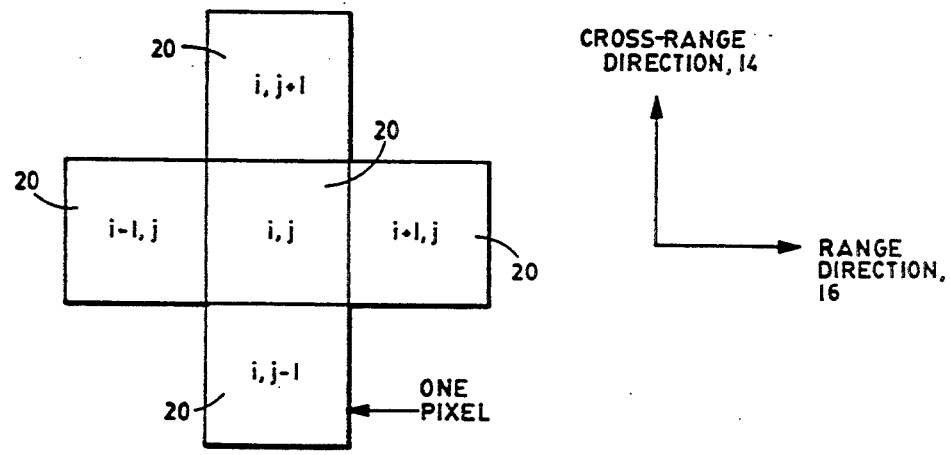
FIGS. 6, 7 and 8 are diagrams useful in understanding the processing described in accordance with the flow diagram of FIGS. 5A, 5B and 5C.

The first set of median filtering performed by processor 19, smooths the normalized data to remove speckle noise. The five-point median filter determines a new value for each pixel or position in the image frame (except the edges) from the five pixels, or positions, that form a cross centered on the pixel of interest, as shown in FIG. 6. The median value of the five pixels is determined; this determines the new value of the pixel, or position, of interest (i,j), where i is the range position and j is the cross-range position. This is done for every pixel or position in the image frame except the edges. The new pixel values are stored in a section of memory 18 and do not replace the old pixel values stored in a different section of the memory 18 until all of the pixels are done. (This process is repeated three times for obtaining an average).

Quantization (Step 4)

The quantization process performed by processor 19, which follows, replaces the 256-level image data stored in a section of the memory 18 by one of three values, (i.e. here 0, 1 or 2) which represent background, shadow or highlight, respectively. This is done by thresholding the pixel data at two levels: the shadow threshold, $t_s$, and the highlight threshold, $t_h$.

Pixels having intensities below the shadow threshold, $t_2$, are mapped to shadows (i.e. here value 1)

Pixels having intensity levels above the highlight threshold, $t_h$, are mapped to highlights (i.e. here value 2)

Pixels having intensity levels between the two thresholds, $t_s$, $t_h$ are mapped to background (i.e. here value 0).

Figure 7:
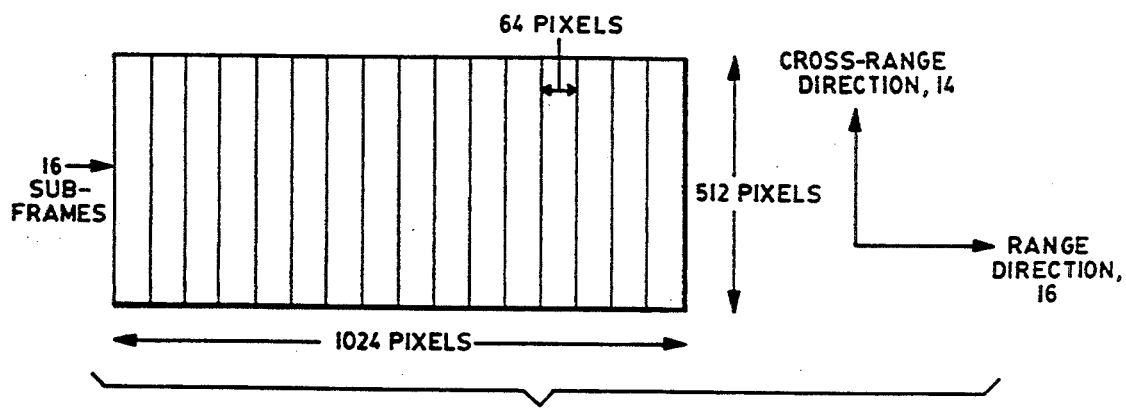

The quantization process is performed by the processor on a sub-frame basis where the sub-frames are 64 by 512 pixel sections of the image frame, as shown in FIG. 7. Different shadow and highlight thresholds $t_s$, $t_h$, respectively, are determined for each of the 16 sub-frames and are used to segment the pixels in that sub-frame. The thresholds $t_s$, $t_h$ are selected so that a fixed percentage of the pixels are shadows and fixed percentage of the pixels are highlights. This is done by the processor 19 forming the cumulative distribution function (CDF) of the pixel data in the sub-frame. To form the CDF, the histogram of the pixel data in the sub-frame is determined first. This is done by counting the number of occurrences of each of the 256 levels between 0 and 255. Then, the probability density function (pdf) is determined by dividing the histogram by the number of pixels in the sub-frame (64 by 512=32,768).

The CDF is determined by the processor 19 from the pdf as follows:

$$C(0)=P(0)$$

$$C(k)=C(k-1)+P(k) \text{ for } k=1,2,\ldots,255$$

where P is the pdf, C is the CDF and k is the intensity level (note that C(255)=1). Once the CDF is calculated, the processor 19 examines it to determine the shadow and highlight thresholds, $t_s$, $t_h$. Let $p_s(0<p_s<1)$ be the desired percentage of shadow pixels and Ph be the desired percentage of highlight pixels. Then, the shadow threshold ($t_2$) and the highlight threshold ($t_h$) are determined by:

$$C(t_s)=p_s$$

$$C(t_h)=1-p_2.$$

The CDF must be examined to determine at what levels the above equations are satisfied. The thresholds $t_s$, $t_h$ are then used by the processor 19 to convert the pixel image data to a quantized image of three pixel values (i.e. here 0, 1 or 2). This is done by the processor 19 for each subframe.

The shadow threshold $t_s$ and a highlight threshold $t_h$ are used to partition the pixels into the three segmentation values (or classes). These thresholds $t_s$, $t_h$ are determined based, as described above, on the image data statistical character to provide robustness to bottom-type variation and an enhanced ability to detect in low contrast situations. The thresholds $t_s$, $t_h$ are selected as predetermined percentage points of the discrete probability distribution of the pixel values in the input image, in this case, the output of the speckle filter. Thus, for example, here pixels in the top 10% of pixel values are defined as highlight pixels (i.e. $C(t_h)=0.9$) and pixels in the bottom 10% as shadow pixels (i.e. $C(t_h)=0.1$) and others as background.

The threshold selection is done by processor 19 on subframes of the frame as shown in FIG. 7. The image is statistically non-stationary in the range direction 16 due to sub-optimally matched sonar TVG curves, imperfect normalization and reduced energy in the far field. Thus, in this case, the discrete probability distribution is found in 16 subframes resulting in 32 thresholds for a much improved and more faithful segmentation.

Three nine-point median filters (Step 5)

Figure 8:
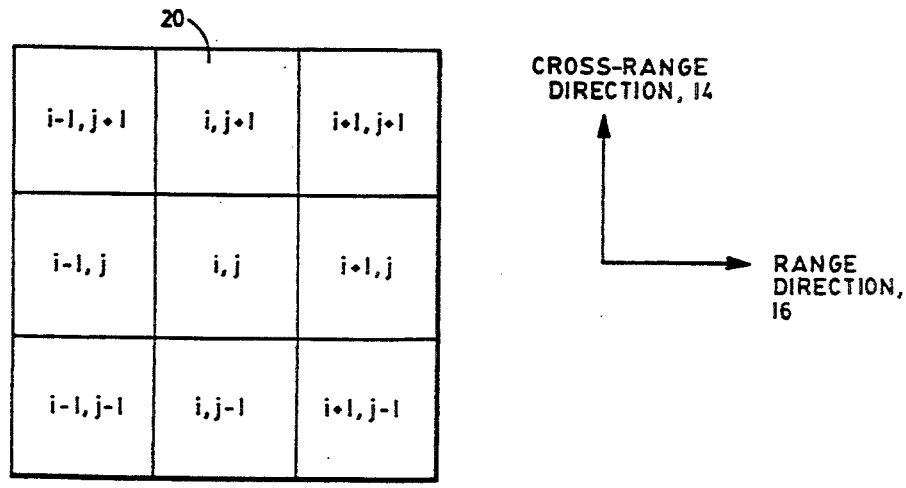

The second set of median filtering performed by processor 19 is essentially the same as the first set except that a three by three square of pixels, centered on the pixel of interest is used, as shown in FIG. 8. The second set of median filters have the function of smoothing the quantized image data.

The three level image resulting from the Step 5 is then filtered to remove small, isolated regions. Median filtering is used to preserve region edges. Here a 3×3 kernel iterated 3 times.

Connected-components (Step 6)

A connected components algorithm is performed by the processor 19 on the quantized data levels stored in memory 18, for example, the quantized data levels shown in FIG. 9A, to identify regions of contiguous shadow or highlight pixels. A shadow region is a group of contiguous shadow pixels (i.e. pixels having a quantized data level of 1) and a highlight region is a group of contiguous highlight pixels (i.e. pixels having a quantized data level of 2). As will be described, the connected components algorithm labels each pixel with a region number so that all contiguous pixels belonging to the same contiguous region have the same "region number". For example, in FIG. 9A, there are four labelled region numbers 1–4: Region numbers 1 and 3 are shadow regions; and, region numbers 2 and 4 are highlight regions. The remaining regions are background regions.

More particularly, the region identification process is performed by the processor 19 making three "passes" through data stored in memory 18. In the first "pass", highlight regions are separated from shadow regions by at least one pixel whenever a highlight region is bounded by a shadow region. This is performed by the processor 19 investigating each pixel, sequentially. If the pixel under investigation is a shadow (i.e., has a quantized data level of 1) and if there is a highlight pixel in any one of the eight pixels contiguous to it, (i.e., if any one of the eight pixels surrounding the central pixel under investigation has a quantized data level of 2) then the quantized data level of the pixel under investigation is changed to a background pixel (i.e., the quantized data level of the central pixel is changed from 1 to 0). The completion of this first "pass" results in a separated segmentation array of quantized data levels, as for example, the array shown in FIG. 9A which is now stored by processor 19 in memory 18.

During the second "pass", the processor 19 assigns "integer indices" to highlight and shadow pixels as codes for eventually producing, in the third "pass", the "region numbers". The "integer indices" are assigned by passing a 2×2 pixel kernel, shown in FIG. 9B, sequentially over each pixel $P_n(i,j)$ in the segmented array. As indicated in FIG. 9B, the pixel $P_n(i,j)$ is located in the upper right hand corner of the kernel. The pixel to the left of pixel $P_n(i,j)$ is a position labelled "a", the pixel diagonally down to the left of pixel $P_n(i,j)$ is a position labelled "b", and the pixel below pixel $P_n(i,J)$ is a position labelled "c".

Figures 9C, 9D, 9E, 9F, 9G, 9H, 9I:
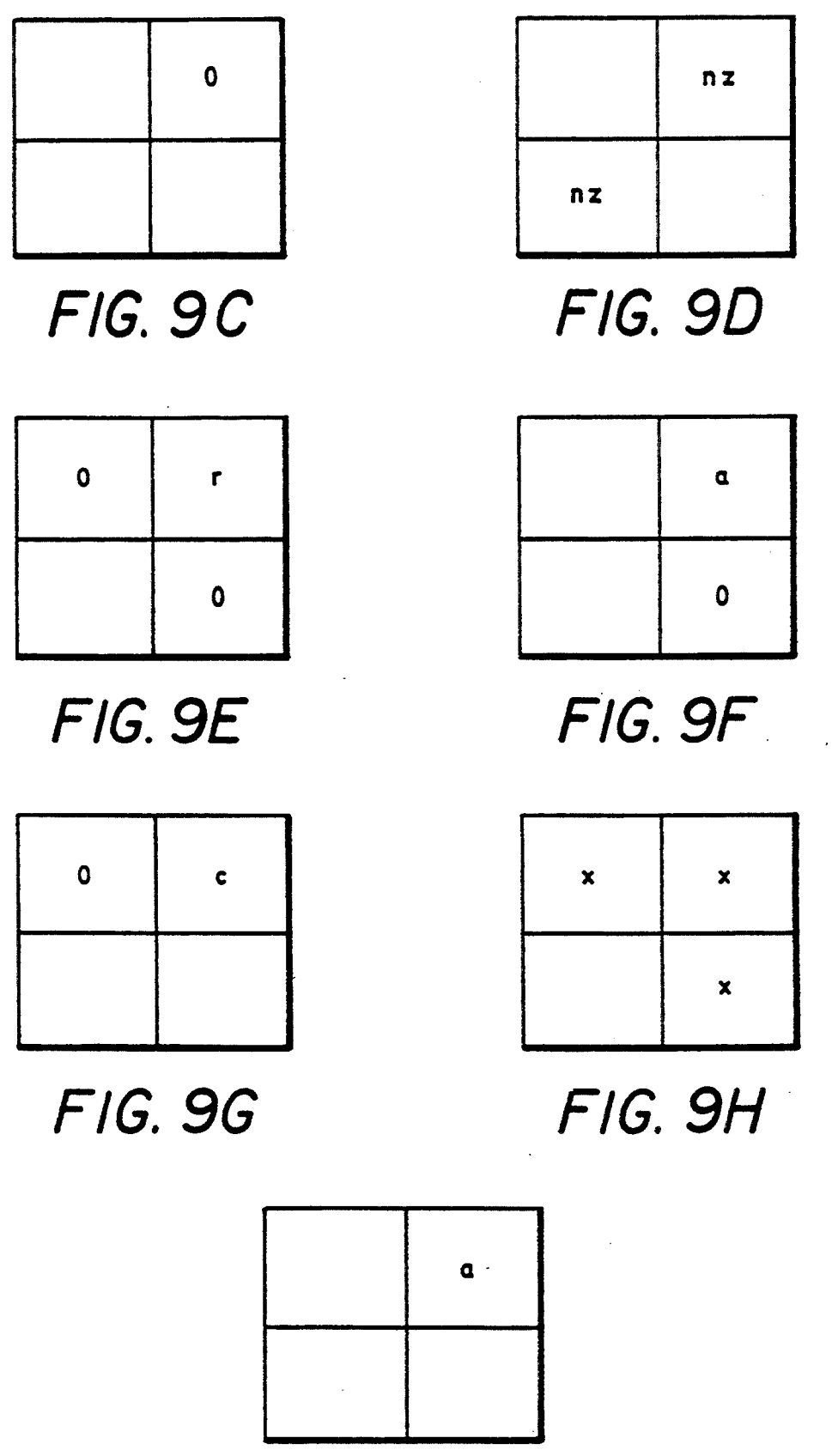

For each pixel, $P_n(i,j)$ under investigation during the second "pass", the kernel is placed over four pixels, with the pixel $P_n(i,j)$ under investigation being in the upper right hand corner, as described above in connection with FIG. 9B. The kernel moves from the left of the bottom row of the segmented array, (i.e. pixel P(2,2)), FIG. 9A, to the right until the pixel in the last column of the second row (i.e. pixel P(2,8)) is investigated. The kernel then moves to the second left hand column of the next higher row (pixel P(3,2)) and the process continues until the kernel reaches the right column of the top row (pixel P(8,8)). The quantized data level array in FIG. 9A stored in memory 18 is modified by processor 19, into an "integer index" array, as shown in FIG. 9K, as a result of an investigation made during the second "pass". In the "integer index" array (FIG. 9K) an "integer index" is assigned to the pixel position under investigation in accordance with a set of rules (illustrated in FIGS. 9C to 9I). Before discussing the rules, it is first noted that an "integer index table" shown in FIG. 9J is maintained by processor 19 to record, sequentially from the top of the "integer index table", each "integer index" (r) used in the array modification process and the "value" of such "integer index", as will be described in detail hereinafter. Suffice it to say here, however, that the "value" initially assigned to the "integer index" in the "integer index table" is the same as the "integer index". This is based on an assumption that each time a new "integer index" is determined, a new region number has been generated, and thus the "value" in the "integer index table" represents the "region number". However, such "value" may be changed if the processor 19 recognizes that, after a new, subsequent "integer index" has been generated, the previously established "index integer" really belongs to the new, subsequent "region number". Thus, the old "index number" must be assigned the same "value" as the new "integer index".

The set of rules is as follows: At each kernel position, if the quantized data level of the pixel $P_n(i,j)$ (FIG. 9B) under investigation is 0, then the "integer index" assigned to such pixel $P_n(i,j)$ in the modified array of FIG. 9K is 0 (i.e., Rule 1, FIG. 9C); else, if the "integer index" of the pixel in the "b" position of the kernel is non-zero (i.e., nz), then the "integer index" in the "b" position is assigned to the pixel $P_n(i,j)$ in the modified array (FIG. 9K) (i.e., Rule 2, FIG. 9D); else, if the "integer indices" of the pixels in the positions "a" and "c" of the kernel are 0, then the "integer index" assigned to the pixel $P_n(i,j)$ in the modified array (FIG. 9K) is equal to the last "integer index" used, as recorded in the "integer index table" (FIG. 9J), incremented by 1 (i.e., the next, incremented integer, $r_{new}$, where $r_{new}=1+r$, and where r is the last recorded "integer index") and the assigned "integer index", $r_{new}$ is entered an "integer index table" (FIG. 9J) (i.e., Rule 3, FIG. 9E); else, if the "integer index" of the pixel in the position "c" of the kernel is 0, the pixel $P_n(i,j)$ is assigned, in the modified, "integer index" array (FIG. 9K) the "integer index" in the "a" position of the kernel (i.e., Rule 4, FIG. 9F); else, if the "integer index" of the pixel in the position "a" of the kernel is 0, the pixel $P_n(i,j)$ is assigned, in the modified "integer index" array (FIG. 9K), the "integer index" in the "c" position of the kernel (i.e., Rule 5, FIG. 9G); else, if the "integer indices" in both the "a" and "c" positions of the kernel are non-zero (i.e., nz) and equal to each other, then the pixel $P_n(i,j)$ is assigned the same non-zero "integer index" as the "integer index" in position "a" (or position "c") (i.e., Rule 6, FIG. 9H); else, the pixel $P_n(i,j)$ is assigned the "integer index" of the "integer index" in position "a" of the kernel and the processor 19 reads each of the "integer indices" in the "integer index table" (FIG. 9J) and each time, if the "value" of the read index equals the "value" of the "integer index" in position "c" of the kernel, then the "value" for the currently read "integer index" read from the "index integer table" is reset to a "value" equal to the "integer index" of position "a" of the kernel.

Referring again also to FIG. 9A, the first pixel under investigation by the processor 19 during the second "pass" is pixel P(2,2). Thus, according to Rule 1, because the pixel under investigation, P(2,2), has a 0 quantized data level, the modified, "integer index" array (FIG. 9K) is assigned an "integer index" of 0. The use of the "integer index" 0 is recorded at the top of the "integer index table" (FIG. 9J) and such recorded "integer index" is assigned a "value" of 0, as shown. Likewise, the next pixel under investigation, P(2,3), is assigned an "integer index" of 0 in the "integer index" array, FIG. 9K. The next pixel under investigation is pixel P(2,4) and because the quantized data level of such pixel is not zero, and because the "integer index" in position "b" of the kernel is zero, and because the "integer index" of positions "a" and "c" of the kernel are 0, then from Rule 3, such pixel, P(2,4) is assigned an "integer index" equal to the next sequentially available "integer index" (that is, the last "integer index" used (and as recorded in the "integer index table" (FIG. 9J) is 0), incremented by 1); that is, pixel P(2,4) is assigned an "integer index" of 1, as shown in FIG. 9K. The use of a new "integer index" (i.e., 1) is recorded in the "integer index table" (FIG. 9J) and is assigned a "value" 1, as shown in the first "value" column of the "integer index table". Pixels P(2,5), P(2,6), and P(2,7) are assigned an "integer index" of 0 in accordance with Rule 1 because the quantized data levels thereof are 0 as shown in the quantized data array of FIG. 9A.

Continuing, pixel P(2,8) has, as shown in FIG. 9A, a quantized data level of 1. Further, the "integer index" in the position "b" of the kernel (i.e., pixel P(1,7) is 0 (and the "integer index" thereof has not been previously modified, as shown in FIG. 9K). Still further, the "integer indices" of pixels P(2,7) and P(1,8) are both zero. Thus, from Rule 3, pixel P(2,8) is assigned the next sequential "integer index", 2, (i.e., the last "integer index" used (i.e. 1) incremented by 1, as shown in FIG. 9K. The use of a new "integer index", 2, is recorded in the "integer index table" (FIG. 9J) and it is assigned a "value" of 2 in the first "value" column, as shown. Next, pixel P(3,2), which has a quantized data level of 2 (FIG. 9A), is assigned an "integer index" of 3 (FIG. 9K) in accordance with Rule 3 because the quantized data level thereof is not 0, and the "integer index" of pixel (3,1) (i.e., the pixel in position "b" of the kernel) is not non-zero (i.e., it is 0, FIG. 9K), and because the "integer indices" in pixels P(3,2) and P(2,2) are 0. The use of a new "integer index", 3, is recorded in the "integer index table" of FIG. 9J, and is assigned a "value" of 3 in the first "value" column, as shown. Pixel P(3,3) is assigned an "integer index" of 0 in accordance with Rule 1 because it has a quantized data level of 0. Pixel P(3,4) is assigned an "integer index" of 1 in accordance with Rule 5 because it does not have a quantized data level of 0, and because the "integer index" of pixel P(2,3) (i.e., the pixel in position "b" of the kernel) is not non-zero (FIG. 9K), and because the "integer indices" of the pixels in position "a" and "c" of the kernel (i.e., pixels P(3,3) and P(2,4) are both not zero, and because the "integer index" of pixel, P(2,4) in position "c" of the kernel is not zero, and because the "integer index" of pixel P(3,3) in position "a" is zero. Pixel P(3,5) is assigned an "integer index" of 1 in accordance with Rule 2. Pixel P(3,6) is assigned an "integer index" of 0 in accordance with Rule 1. Pixel P(3,7) is assigned a new "integer index" of 4 in accordance with Rule 3 and such is recorded in the "integer index table" of FIG. 9J along with its "value" of 4, which is recorded in the first "value" column, as shown. Pixel P(3,8) is assigned an "integer index" of 4 in accordance with Rule 7 because it does not have a quantized data level of 0, and the "integer index" of pixel P(2,7) (i.e., the pixel in position "b" of the kernel) is not nonzero, and because the "integer indices" of the pixels in positions "a" and "c" of the kernel (i.e., pixels P(3,7) and P(2,8) are both not zero and are unequal. Thus, in accordance with Rule 7, the processor 19 assigns as an "integer index" to pixel P(3,8) the "integer index" of the pixel in position "a" of the kernel (i.e., the "integer index" of pixel P(3,7), here an "integer index" of 4. The processor 19 then reads each of the "integer indices" in the "integer index table" (FIG. 9J) and each time, if the "value" of the read index equals the "value" of the "integer index" in position "c" of the kernel, then the "value" for the currently read "integer index" read from the "integer index table" is reset to a "value" equal to the "integer index" of position "a" of the kernel. Here the "integer index" of pixel, P(2,8), is here 2. Thus, the processor 19 then resets the "value" of the "integer index" found ( i. e. here the "value" 2 of the found "integer index" 2) to the "value" of the "integer index" in the "a" position of the kernel (i.e., the processor 19 resets the "value" 2 of the "integer index" 2 in position "c" to the "value" 4, the "value" of the "integer index" in the "a" position). The resetting of the "value" 2 to the "value" of 4 is recorded in the second "value" column of the table (FIG. 9J) for the "integer index" 2.

Continuing, pixel P(4,2) is assigned an "integer index" of 3 in accordance with Rule 5 (i.e., the "integer index" of position "c" of the kernel, here pixel P(3,2)). Pixels P(4,3), P(4,4), P(4,5), and P(4,6) are assigned "integer indices" of 0, 0, 1, 1, respectively in accordance with Rules 1, 1, 2, and 2, respectively. Next, pixel P(4,7) is investigated. It is first noted that Rule 7 applies. Pixel P(4,7) is assigned as an "integer index", the "integer index" of position "a" in the kernel (i.e., the "integer index" of pixel P(4,6), here 1). Next, the processor 19 reads each of the "integer indices" in the "integer index table" (FIG. 9J) and each time, if the "value" of the read index equals the "value" of the "integer index" in position "c" of the kernel, then the "value" for the currently read "integer index" read from the "integer index table" is reset to a "value" equal to the "integer index" of position "a" of the kernel. Here pixel P(3,7) has an assigned "integer index" of 4 and such "integer index" has a "value" of 4. Thus the processor 19 resets the "value" of the "integer index" associated with the position "c" (i.e. the "integer index" 4) to the "value" associated with the "integer index" in the position "a" of the kernel. Here two "integer indices" now have a "value" of 4; "integer index" 2 and "integer index" 4. Thus, the "value" of the "integer index" 4 is reset to a "value" of 1, as shown in the second "value" column of the "integer index table" (FIG. 9J) for "integer index" 4 and in the third "value" column for "integer index" 2. As noted above, pixel P(4,7) is assigned the "integer index" of the "integer index" of the pixel in position "a" of the kernel, here 1, as shown in FIG. 9K.

The process continues with the results produced being shown in FIG. 9K. It is noted that pixel P(5,6) is assigned a "integer index" of 1 from Rule 2. It is also noted that pixel P(6,3) is assigned an "integer index" of 5 in accordance with Rule 3 and that such is recorded in "integer index table" of FIG. 9J. It is also noted that pixels P(7,2), P(7,3), P(7,5), P(7,6) are assigned "integer indices" of 6, 6, 7, 7 in accordance with Rules 3, 7, 3, and 4 respectively. Also note that the "integer index table" (FIG. 9J) was modified when Rule 7 was applied to pixel P(7,3) by resetting the "value" of "integer index" 5 to a "value" of 6, as shown in FIG. 9J.

From FIGS. 9K and 9I, each "value" recorded is associated with a "region number". Thus, from FIG. 9J there are four "values" (i.e. "values" 1, 3, 6 and 7) which is consistent from FIG. 9A, where four regions are also indicated. Further, "value" 1 is associated with "integer indices" 1, 2, and 4; "value" 3 is associated with "integer index" 3; "value" 6 is associated with "integer indices" 5 and 6; and "value" 7 is associated with "integer index" 7.

During the third "pass", the processor 19 labels the different "values" with sequential "region numbers". Thus, pixels with "integer indices" having "values" 1, 3, 6 and 7 are assigned "region numbers" 1, 2, 3 and 4, respectively, as shown in FIG. 9A.

Region selection (i.e., culling) (Step 7).

The area of each one of the non-background regions (i.e. regions 1, 3 and 4) are calculated by the processor 19 counting the number of pixels belonging to each one of the non-background regions via the label map. The non-background regions are sorted by area and those regions which are too small or too large to be conceivably related to mine-like objects are removed from the region table. The region label map (FIG. 9A) is altered to replace the eliminated region pixels with background pixels.

Double Split Window Feature Extraction (Steps 8–13)

Figure 10:
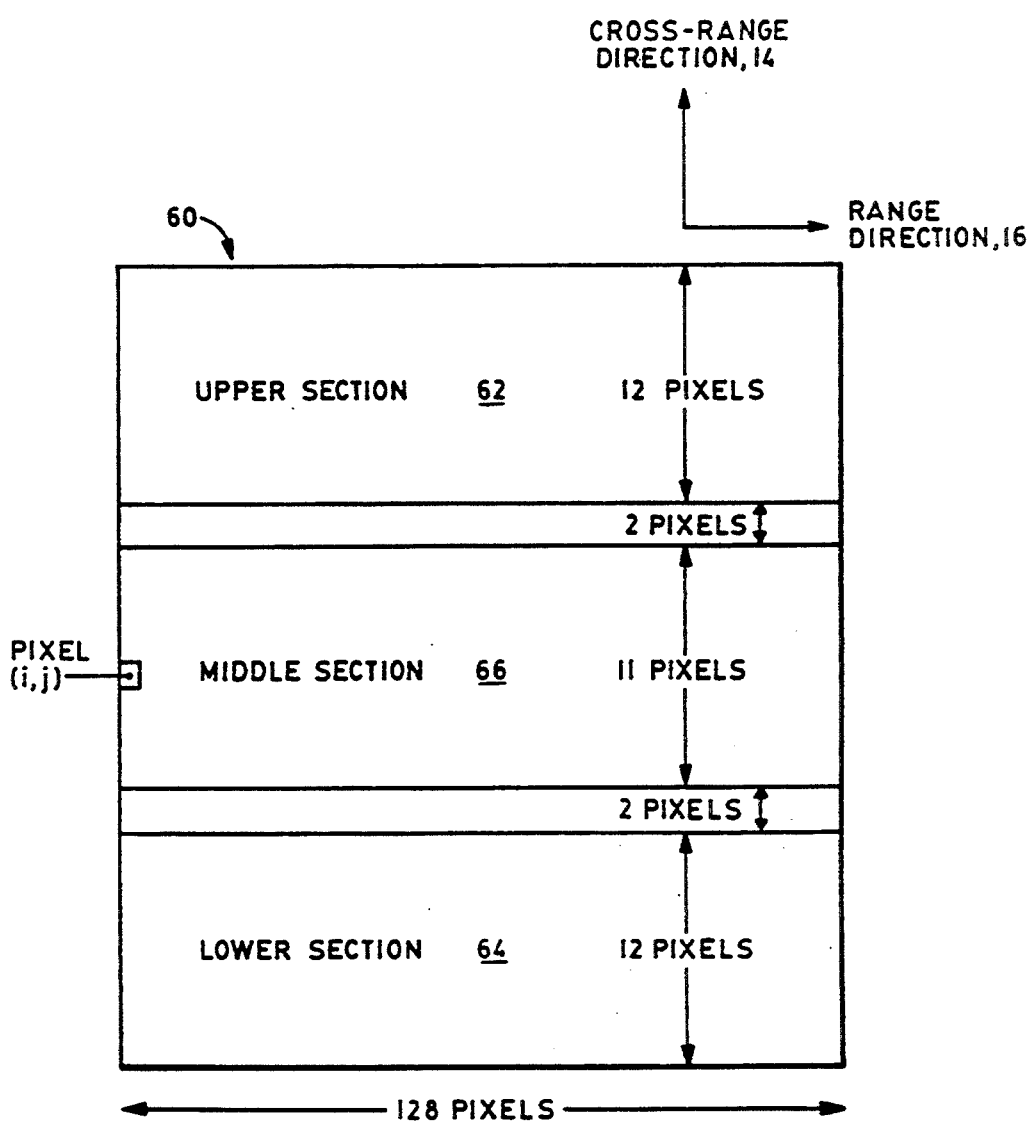
FIG. 10 shows three windows of cells over range scans, each window having data at different cross range positions, the data in such windows being used by the sonar system of FIG. 1 to determine the cross range length of submerged foreign objects.

The processor 19 forms a double split window 60. The window 60 is used by the processor 19 to examine both the normalized image data (Steps 1 and 2) and the region label map (Steps 3–7). Shown in FIG. 10, the window 60 is here 128 pixels long in the range direction 16 and 39 pixels wide in cross-range direction 14. The window 60 is elongated in the range direction 16 and is divided into three main sections: a pair of outer window sections 62, 64; and, a middle window section 66. The middle window section 66 is positioned between an upper one of the outer window sections 62 and a lower one of the outer window sections 64. The upper window section 62 is positioned over pixels forward, in the cross-range direction 14, of the middle window section 66. The lower window section 64 is positioned over pixels rearward, in the cross-range direction 14 of the middle window section 66. Each of the three window sections 62, 64, 66 is 128 pixels long in the range direction 16. The middle section 66 is 11 pixels wide in the cross-range direction 14 and is centered within the window 60. Each of the outer sections 62, 64 is 12 pixels wide in the cross-range direction 14. There is a 2 pixel wide gap 68, 70 in the cross-range direction 14 between the middle section 66 and each of the outer sections 62, 64. Note that: 12+2+11+2+12=39. The window 60 is placed at various locations throughout the image and is used to compare the pixels in the middle section 66 to pixels in each of the outer sections 62, 64 at each window location. The pixels contained in the gaps 68, 70 are not examined.

The window 60 is placed at regular intervals throughout the image frame in order to examine the whole image frame. The window 60 is placed at intervals of 16 pixels in the range direction 16 and at intervals of 2 pixels in the cross-range direction 14.

When the window 60 is placed on the normalized data (Steps 8, 9, 11 and 12), statistics are determined for each section 62, 64, 66 and the middle section 66 is compared to each of the outer sections 62, 64 using the advanced statistics. Statistical tests determine if there is an anomaly in the middle section 66 that may be caused by a mine. When the split window 60 is placed on the region label map (steps 8, 10 and 13), the percentage of region pixels in each window section (percent fill) and the total area of all the regions that are contained (in full or in part) in the middle section 66 (area sum) are determined. The percent fill is used to ensure that any regions of interest are in the middle section 66 as opposed to the outer sections 62, 64. The area sum is used to eliminate very large regions that extend outside of the window 60.

Statistical Feature Calculations (Steps 9, 11 and 12)

In the statistical feature calculations (Steps 9, 11 and 12) performed by processor 19, histograms are determined in each of the window sections (i.e. the upper window section 62, the middle window section 66, and the lower window section 64). That is, the processor 19 considers pixel intensity (grey-level) values in the three window sections 62, 64, 66 involved in the double split window 60 element as previously described. Consider, for example, the center window center 66. The pixels which define the image contained in the center section 66 have a spatial organization which defines the image. One could compute summary statistics involving the pixel grey level values without regard to the spatial organization. An example of a simple summary statistic is the mean (average) grey level intensity. The variance of the grey level intensity gives more information (in a general sense) about the distribution of pixel grey levels and gives the dispersion about the mean of the grey level values. The mean and variance summarize properties of the pixel grey level empirical probability density function (histogram or pdf) which description contains all first-order statistical information in the pixel grey levels. Here, however, the SLS 10 statistical features compare grey level histograms and functions of these and thus uses the complete first-order statistical information rather than the incomplete summary statistics.

Each of three sections of the window (i.e. upper 62, lower 64, middle 66) are examined by processor 19 separately; statistics are determined for each section 62, 64, 66 and the statistics of the outer sections 62, 64 are compared to the statistics of the middle section 66 to determine if an elongated object (elongated in the range direction 16) exists within the middle section 66. That is, the processor compares a distribution of the levels of cells over range scans at a first set of adjacent cross-range positions (i.e., the cells in a first one of the three window sections) with the distribution of levels of cells over a range scan at a second, different set of adjacent cross-range positions (i.e., the cells in a second one of the three window sections) and the distribution of the levels of cells over range scans at a third set of adjacent cross-range positions (i.e., the cells in a third one of the three window sections) to identify the existence of an underwater object.

Several different methods of comparing the window sections were developed, but the underlying principle in each is that if both of the outer sections 62, 64 are significantly different from the middle section 66 and certain other region conditions are met (Step 13), then a mine-like object exists in the middle section 66 (Steps 14–18). The region conditions that must be met (to be discussed in connection with Step 13) have to do with the percentages of region pixels in each of the window sections 62, 64, 66 (to make sure the regions are in the middle window section 66) and with the total area of the detected regions (to avoid detecting very large regions that extend outside the window 60).

The first step (Step 9) in the statistical feature calculations performed by processor 19 (Steps 9, 11 and 12), is to determine histograms in each of the three window sections (i.e. the upper window section 62, the middle window section 66 and the lower window section 64.) The next step (Step 11) is to calculate, for each of the three window sections 62, 64, 66, the probability density functions (pdf) for each of the three window sections: $u_i$, the pdf for the upper window section 62; $s_i$, the pdf for the center window section 66; and $d_i$, the pdf for the lower window section 64 (where i is the ith bin of the histogram). Step 11 also calculates, for each of the three window sections 62, 64, 66, the cumulative distribution functions (CDF) for each of the three window sections: $U_i$, the CDF for the upper window section 62; $S_i$, the CDF for the center window section 66; and $D_i$, the CDF for the lower window section 64 (where i is the ith bin of the histogram).

From the calculated probability density functions (pdf): $u_i$, $s_i$, and $d_i$, and from the calculated cumulative distribution functions (CDF): $U_i$, $S_i$, and $D_i$ (i.e. Step 11), the processor 19 calculates advanced statistics (Step 12). These advanced statistics are: Modified Pearson's Detection Feature; Kolmogorov Statistic Feature; Grey Level Entropy Detection Feature; and, Multinomial Statistic Feature.

Modified Pearson's Detection Feature

A modification of Pearson's chi-squared test for the difference between two populations is used by processor 19 to develop a measure of the statistical difference between the center window section 66 and the upper and lower adjacent window sections 62, 64, respectively.

Pearson's chi-squared test statistic is used to indicate whether or not a test population can statistically be regarded as having the same distribution as a standard population. The test statistic is expressed as $$\chi^2 = \sum_{i=0}^{63} \frac{(N_i - nq_i)^2}{nq_i}$$

where $N_i$ are the observed frequencies and $nq_i$ are the expected frequencies. $\chi^2$ is a measure of the departure of the observed $N_i$ from their expectation $nq_i$.

For the side looking sonar system 10 the outer windows 62, 64 are used to define the expected population. A modified Pearson's test statistic to remove the expected population bias introduced by the denominator term and a test statistic is computed by the processor 19 using the empirical probability density functions (pdf) as follows. Let $s_i$, $u_i$, $d_i$ be the value of the ith bin of the pdf from the center (s), upper (u), and lower (d) window sections 66, 62, 64, respectively. The "modified Pearson's" test statistic is thus, $$p_u = \sum_{i=1}^{256} (s_i - u_i)^2$$

$$p_d = \sum_{i=1}^{256} (s_i - d_i)^2$$

for the upper and lower window sections 62, 64, respectively. The processor 19 combines $P_u$ and $P_d$ to produce a test statistic for the window set defined as follows:

$$P_{u,d} = \min (P_u, P_d)$$

This logical ANDing requires both component test statistics ($P_u$, $P_d$) to simultaneously indicate the presence of a statistical anomaly. This protects against spurious detections due to background artifacts in only one window.

Kolmogorov Statistic Feature

This statistical analysis provides a "goodness-of-fit" test. The Kolmogorov statistic tests the hypothesis that two populations are statistically the same by use of the cumulative distribution function. Instead of using the test in the context of analysis, the test statistic is used as a feature.

For this SLS 10 feature the cumulative distribution functions (CDF) of the grey levels in the three window sections 62, 64, 66 are computed. Let $S_i$, $U_i$, $D_i$, represent the value in the ith bin of the CDF from center, upper, and lower window sections 66, 62, 64, respectively. Then, $$k_u = \max_{i=0}^{63} |S_i - U_i| \text{ and } k_d = \max_{i=0}^{63} |S_i - D_i|$$

are the component statistics. As before the processor 19 combines these to form the detection statistic. Thus, $$K_{u,d} = \min \{K_u, K_d\}$$

Grey Level Entropy Detection Feature

The entropy of a statistical distribution is defined as, $$H_p = \sum_{k=1}^{63} p(K) \log_2[p(K)]$$

It is interpreted as the expected value of information (in the sense of Shannon) in p, where p in this expression is the pdf. Given the pdf's in the three window sections 66, 62, 64, respectively, (s,u,d), the processor 19 calculates $H_s$, $H_u$, $H_d$, the entropy for each of the window sections 66, 62, 64, respectively. The difference in entropy between the center window section 66 and the outer window sections 62, 64 is then used as a detection feature. Thus, $$E_{ud} = \min \{H_u - H_s, H_d - H_s\}$$

The processor 19 takes the difference unlike the Kolmogorov feature because the sign of the result is significant. That is, the entropy in a single one of the three window sections 62, 64, 66 alone has an intrinsic significance which indicates the presence of unusual grey level distributions. Thus, the entropy feature has an absolute significance in contrast to the previous two features which are relative comparisons.

Multinomial Statistic Feature

This feature essentially measures the likelihood of the empirical pdf in the center window section 66 relative to each of the outer window sections 62, 64 which are assumed to represent universal populations. It treats the empirical pdf of the center window section 66 as the outcome of a series of multinomial trials. The probability of the so-formed pdf is given by the multinomial density. Here, the processor 19 assumes the population pdf is given by either outer window sections 62, 64. The multinomial density is given by, $$p(\bar{k}, \bar{\theta}) = p(k_1, \ldots, k_b, \bar{\theta}) = \frac{n!}{k_1! \ldots k_b!} \theta_1^{k_1} \ldots \theta_b^{k_b}$$

where $n = \Sigma k_i$ is the number of trials or pixels in the one of the outer window sections 62, 64 under consideration, $\bar{\theta}$ is a probability vector, i.e., $\theta_i > 0.0$ $\overline{V}i$ and $\Sigma \theta_i = 1.0$, b is the number of bins and $\theta_i^{k_i}$ is the probability of the $\theta_i$ pixel level occurring $k_i$ times in the n pixel population of the window section.

The processor 19 implicitly calculates component probabilities for upper and lower window sections 62, 64 by deriving $\bar{\theta}$ from u or d (the pdfs associated with upper and lower window sections 62, 64). The $k_i$ are determined from the center window 66 pdf. For computational reasons the processor 19 actually calculates the information associated with the two probabilities. The information is a function of the pdf thus, $I(p) = -\log_2(p(\bar{k},\bar{\theta}))$. This has the benefit of the multinomial density becoming computationally tractable for the parameters. Thus, $$I(p(\bar{k},\bar{\theta})) = -T(n) + \sum_{i=1}^{b} [T(k_i) - k_i \log \theta_i]$$

where $$T(l) = \sum_{j=1}^{l} \log j$$

becomes the information measure of the occurrence of a particular histogram in the center window section 66 given an outer window section population. As here implemented, the T(l) and log functions are table lookups. The processor 19 now forms $$m_{u,d} = \min \{I(u), I(d)\}$$

for the aggregate multinomial detection feature.

Percentage Fill and Total Area of Region Features (Steps 8, 10 and 13)

Constraints on acceptable region properties are used by processor 19 to improve statistical detector performance. The presence of a predominance of pixels in the center window section 66 belonging to contiguous regions suggests the influence of a mine-like object. Typical noise backgrounds will not produce significant contiguous regions as a result of the quantization and region selection (i.e., culling) operations.

Figure 11:
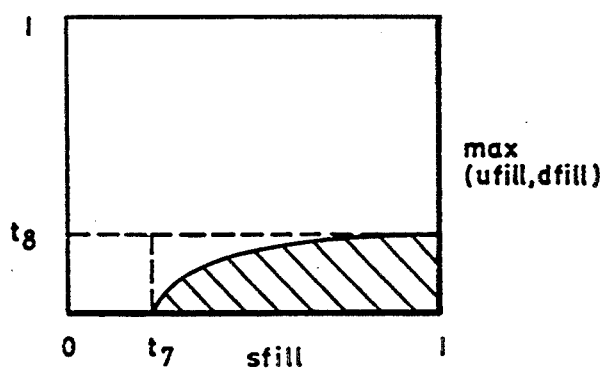
FIG. 11 is a diagram useful in understanding the operation of the sonar system of FIG. 1 in determining mine like submerged objects.

The percent fill constraint is used to ensure that the regions of interest are in the middle window section 66 as opposed to the outer window sections 62, 64. For each window location:
 1. The total number of highlight or shadow region pixels in each of the lower, middle and upper window sections 62, 66, 64 is counted.
 2. The number of region pixels in each of the window sections 62, 66, 64 is divided by the total number of pixels in the window section 60. (The middle window section 66 has $11 \times 128 = 1,048$ pixels and each of the outer window sections 62, 64 have $12 \times 128 = 1536$ pixels.) This gives the "percent fill" for each of the three window sections 62, 66, 64.
 3. The maximum of the lower and upper window sections 62, 64 percent fill is determined:

$$f_o = \max(f_l, f_u)$$

where $f_l$ is the lower window section 64 percent fill, $f_u$ is the upper window section 62 percent fill and $f_o$ is the maximum of the lower and upper window sections percent fill.
 4. The percent fill threshold is a function of the middle window section 66 percent fill. The percent fill calculation is determined as follows:

$$f_{oth} = 0.0 \quad \text{if } f_m \leq 0.1$$

$$f_{oth} = 0.4 \sqrt{\frac{f_m - 0.1}{1.0 - 0.1}} \quad \text{if } 0.1 \leq f_m \leq 0.4515625$$

$$f_{oth} = 0.25 \quad \text{if } f_m \geq 0.4515625$$

where fm is middle window section 66 percent fill and $f_{oth}$ is the percent fill threshold.
 5. If the maximum of the outer window section 66 percent fills is less than the percent fill threshold, then a detection may be made. FIG. 11 shows the relationship between the middle window section 66 percent fill and the maximum of the outer window section 62, 64 percent fills that must be true in order for a detection to be made.

The area sum constraint is used to eliminate very large regions that extend outside of the window 60. For each window location:
 1. The area sum threshold is determined; it is a function of the middle window section 66 percent fill:

$$a_{sth} = n_m \times 2.0 \quad \text{if } f_m \leq 0.4$$

$$a_{sth} = n_m \times [2.0 + 6.0(f_m - 0.4)] \quad \text{if } 0.4 \leq f_m \leq 0.65$$

$$a_{sth} = n_m \times 3.5 \quad \text{if } f_m \geq 0.65$$

where $f_m$ is the middle window section 66 percent fill, $n_m$ is the number of pixels in the middle window section 66 ($11 \times 128 = 1,048$) and $a_{sth}$ is the area sum threshold.
 2. The regions that are contained (in full or in part) in the middle window section 66 are determined by processor 19. This is done by examining every pixel in the middle window section 66 when the window 60 is placed on the region label map (FIG. 9). Any region number that appears is added to a list and duplicates are removed. The end result is a list in memory 18 of all regions in the middle window section 66.
 3. The areas of the regions in the list are summed to determine the area sum.
 4. If the area sum is less than the area sum threshold then a detection may be made.

FIG. 11 shows the acceptance region related to the percent fill constraint in cross hatching. "sfill", "ufill" and "dfill" are the proportion of region pixels for the center, upper and lower window sections 66, 62, 64, respectively. Generally, the constraint insures that the center window section 66 be largely composed of region pixels at the same time that region pixels are limited in the worst of the outer window sections 62, 64. Parameters t7 and t8 have been determined empirically and a quadratic function is used to partition the space. Particular t7 and t8 and the partition function are not essential, but use of percent fill and comparison of "sfill", "ufill" and "dfill" is significant.

A final region constraint requires that the total number of pixels of regions intersected by the center window section 66 be less than a multiple of the number of pixels in the center window section 66. This multiple is varied between 2.0 and 3.0 as a linear function of "sfill". The area constraint feature guards against the spurious detection of large contiguous regions while the percent fill constraint principally guards against spurious detection of finely fragmented regions.

Decision Space Calculation (Steps 14–17)

There are seven features which are combined by processor 19 in Steps 14–17 to produce the mine-present decision; the four advanced statistical features (modified Pearson's, Kolmogorov, grey level entropy, multinomial described in connection with Step 12) together with three region features (percent fill, percent fill threshold and area sum threshold described in connection with Step 13) which are used as constraints. The four statistical features (modified Pearson's, Kolmogorov, grey level entropy, multinomial) are first examined by the processor 19 in a logical comparison of threshold exceedances. The three region-derived features (percent fill, percent fill threshold and area sum threshold) are then used to accept or reject a statistically affirmative decision.

Generally, large values of any of the statistical features might be taken to indicate a significant statistical difference between the center and adjacent windows. However, this proves not to be sufficient for the mine detection problem due to fluctuation in the naturally occurring anisotropic background. The SLS 10 processor 19 relies on the combination of the statistical features to evaluate evidence for mines.

The logical decision space for the statistical features is best represented in logical equation form as $$(p > t_3 \ \& \ k > t_2) \text{ or } (p > t_4 \ \& \ k > t_1) \quad \text{(Clause 1)}$$

or $$(m > t_5 \ \& \ e > 0.0) \text{ or } (m > t_6) \quad \text{(Clause 2)}$$

where p is the modified Pearson's feature, k is the Kolmogorov feature, e is the grey level entropy feature and m is the multinomial feature. Optimum $t_i$ are determined empirically by training on data with identified mine targets. Note that Clause (1) above works with units that are probability increments while Clause (2) above works with units of information in bits (because when logarithms are taken for the calculation base 2 is used).

Constraints on acceptable region properties are used in Steps 16 and 17 to improve statistical detector performance. In Step 16 the presence of a predominance of pixels in the center window section belonging to contiguous regions suggests the influence of a mine-like object. (Typical noise backgrounds will not produce significant contiguous regions through the segmentation and region selection (i.e., culling) operations). The percent fill constraint is used to ensure that the regions of interest are in the middle window section 66 as opposed to the outer window sections 62, 64. In Step 16 the area sum constraint is used to eliminate very large regions that extend outside of the window 60.

More particularly, the general principles of the SLS are applied to find evidence of mine-like objects in SLS images by means of specific parameter selections. Most notably, the center and adjacent window section lengths, widths, spacings and increment overlaps are broadly matched to expected mine-like evidence spatial dimensions. Parameterization of the statistical feature thresholds has as much to do with background and sonar characteristics as it does with mine-like object characteristics. It is, therefore, conceivable that the SLS window sections could be adjusted to suit detection of other kinds of objects with known SLS image properties.

The SLS is able to work with very marginal image evidence (at or near zero dB SNR) to produce the mine-like object decision.

If the region appears to contain a mine-like object, such region is added to a list of mine-like objects (Step 17). The SLS does not falsely detect rocks, vegetation or transition areas and correctly finds the mine-like objects, the evidence for which in the image is marginal.

The process continues until data from the last window has been processed.

Having described a preferred embodiment of the invention it will now be apparent to one of skill in the art that other embodiments incorporating its concepts may be used. It is felt, therefore, that this invention should not be restricted to the preferred embodiment but rather should be limited only by the spirit and scope of the appended claims.

What is claimed is:

1. A method of identifying a foreign object comprising the steps of:
    providing a two dimensional array of pixels, each one of the pixels representing the intensity of a signal at a predetermined range position and a predetermined cross-range position from a reference position;
    quantizing the intensity of each one of the pixels into one of a plurality of levels; and
    comparing a distribution of the levels of pixels over a range scan at a cross-range position with the distribution of levels of pixels over a range scan at a different cross-range position to identify the existence of a foreign object.

2. The method as recited in claim 1 wherein the step of quantizing comprises the steps of:
    sliding a median filter across the pixels and determining a median value for each one of the pixels;
    subdividing the pixels into a plurality of subframes and determining a shadow threshold and a highlight threshold for each one of the subframes;
    segmenting each one of the pixels in each one of the subframes into one of three values; and
    sliding a different median filter across the pixels and determining a median value for each one of the pixels.

3. The method as recited in claim 2 wherein the step of subdividing and determining comprises the steps of:
    determining a probability density function for each one of the subframes; and
    forming a cumulative distribution function for each one of the subframes.

4. The method as recited in claim 2 wherein the three values include a shadow value, a background value and a highlight value and the step of quantizing further comprises the steps of:
    separating each pixel with a shadow value from a pixel with a highlight value by at least one pixel with a background value whenever a highlight region is bounded by a shadow region;
    assigning an integer index to each pixel; and
    labeling each pixel with a region number in accordance with the integer index associated with each pixel to provide background regions, shadow regions and highlight regions.

5. The method as recited in claim 1 wherein the step of comparing comprises the steps of:
    sorting the shadow regions and highlight regions by area; and
    eliminating those regions which are too small and too large as related to mine-like objects and replace any eliminated region pixels with background pixels.

6. The method as recited in claim 1 wherein the step of comparing comprises the steps of:
    sliding a split window having multiple sections across the array of pixels;
    examining each pixel under each section; and determining if there is an anomaly in one of the sections.

7. The method as recited in claim 6 wherein the step of determining if there is an anomaly comprises the steps of:
    determining histograms for each one of the sections;
    calculating probability density functions for each one of the sections;
    calculating cumulative distribution functions for each one of the sections; and
    calculating advanced statistics from the probability density functions and the cumulative distribution functions.

8. The method as recited in claim 6 wherein the step of determining if there is an anomaly comprises the steps of:
    calculating a percent fill for each one of the sections; and
    calculating a percent fill threshold and an area sum threshold.

9. The method as recited in claim 7 wherein the step of comparing further comprises the steps of:
    calculating a percent fill for each one of the sections;
    calculating a percent fill threshold and an area sum threshold; and
    determining if there are mine like objects on one of the sections.

10. The method as recited in claim 6 wherein the step of determining if there is an anomaly comprises the step of providing a list of mine-like objects.

11. A method of identifying a foreign object comprising the steps of:
    providing a two dimensional array of pixels, each one of the pixels representative of a signal having an intensity from a predetermined range position and a predetermined cross-range position with reference to a reference position;
    quantizing the intensity of each one of the pixels into one of a plurality of levels comprising the steps of:
        sliding a median filter across the pixels and determining a median value for each one of the pixels;
        subdividing the pixels into a plurality of subframes and determining a shadow threshold and a highlight threshold for each one of the subframes;
    segmenting each one of the pixels in each one of the subframes into one of three values wherein the three values include a shadow value, a background value and a highlight value; and
    sliding a different median filter across the pixels and determining a median value for each one of the pixels;
    separating each pixel with a shadow value from a pixel with a highlight value by at least one pixel with a background value whenever a highlight region is bounded by a shadow region;
    assigning an integer index to each pixel;
    labeling each pixel with a region number in accordance with the integer index associated with each pixel to provide background regions, shadow regions and highlight regions; and
    determining from the background regions, shadow regions and highlight regions an identification of a foreign object.

12. The method as recited in claim 11 wherein the determining step comprises the steps of:
    sorting the shadow regions and highlight regions by area;
    eliminating those regions which are too small and too large as related to mine-like objects and replace any eliminated region pixels with background pixels;
    sliding a split window having multiple sections across the array of pixels;
    examining each pixel under each section; and
    determining if there is an anomaly in one of the sections.

13. The method as recited in claim 12 wherein the step of determining if there is an anomaly comprises the steps of:
    determining histograms for each one of the sections;
    calculating probability density functions for each one of the sections;
    calculating cumulative distribution functions for each one of the sections; and
    calculating advanced statistics from the probability density functions and the cumulative distribution functions.

14. The method as recited in claim 13 wherein the step of determining if there is an anomaly further comprises the steps of:
    calculating a percent fill for each one of the sections;
    calculating a percent fill threshold and an area sum threshold; and
    determining if there are foreign objects in one of the sections.

15. A method for mapping the floor of a body of water to identify underwater objects comprising the steps of:
    storing signals representative of intensity of a signal in a two dimensional array of pixels, each one of the pixels representing the intensity of the signal at a predetermined range position and a predetermined cross-range position from a reference position;
    quantizing the intensity of each one of the pixels into one of a plurality of levels; and
    comparing a distribution of the levels of pixels over a range scan at a cross-range position with the distribution of levels of pixels over a range scan at a different cross-range position to identify the existence of an underwater object.

16. The method as recited in claim 15 wherein the distributions of the comparing step are probability distributions.

17. The method as recited in claim 15 wherein the distributions are statistical features including at least one of the following features: a Modified Pearson's Detection Feature; a Kolmogorov Statistic Feature; Grey Level Entropy Detection Feature; and, a Multinomial Statistic Feature.

18. The method as recited in claim 16 wherein the comparing step comprises the step of comparing a distribution of the levels of pixels over range scans at a third set of adjacent cross-range positions with the distribution of levels of pixels over a range scan at the first set of adjacent cross-range position to identify the existence of an underwater object.

19. The method as recited in claim 18 wherein the first set of adjacent cross range positions is disposed at cross range positions between the cross range positions of the second and third sets of cross range positions.

* * * * *